United States Patent [19]
Massey

[11] 3,744,752
[45] July 10, 1973

[54] DETACHABLE HANDLE FOR CONTROL DEVICES

[75] Inventor: Roger G. Massey, Holden, Mass.

[73] Assignee: The Parker & Harper Mfg. Co., Inc., Worcester, Mass.

[22] Filed: Nov. 17, 1971

[21] Appl. No.: 199,596

[52] U.S. Cl............... 251/292, 287/53 H, 251/288, 137/556.5
[51] Int. Cl............................................. F16k 31/60
[58] Field of Search................. 251/291, 292, 315, 251/161, 180, 181, 188, 192, 284–288, 309, 312; 306/38; 16/111, 112, 114, 110; 85/8.8; 287/53 H; 292/352; 81/121, 90; 137/637.3, 637.5, 556.5

[56] References Cited
UNITED STATES PATENTS

| | | |
|---|---|---|
| 339,440 | 4/1886 | Libby................................ 292/352 |
| 2,487,803 | 11/1949 | Heimann............................. 85/8.8 |
| 3,356,337 | 12/1967 | Olen.................................. 251/315 |
| 871,869 | 11/1907 | Gordon............................. 251/292 |
| 2,245,751 | 6/1941 | Blackmore..................... 85/8.8 UX |
| 2,696,219 | 12/1954 | Barksdale.................... 251/286 X |
| 2,805,837 | 9/1957 | Kessler............................. 251/292 |
| 3,168,279 | 2/1965 | Anderson et al. ................. 251/181 |
| 3,339,884 | 9/1967 | Smith et al.................... 251/315 X |
| 95,724 | 10/1869 | Rausch............................. 251/292 |

Primary Examiner—Henry T. Klinksiek
Attorney—Thomas N. Tarrant

[57] ABSTRACT

A handle for a rotary control device, such as a valve, is secured to the control stem by a spring clip independent of any other fastening device for securing the stem assembly. Removal of the spring clip permits the handle to be stored separately for security against undesired operation of the control device.

9 Claims, 3 Drawing Figures

PATENTED JUL 10 1973 3,744,752

INVENTOR.
ROGER G. MASSEY

Thomas N. Tamount
ATTORNEY

# 3,744,752

DETACHABLE HANDLE FOR CONTROL DEVICES

BACKGROUND OF THE INVENTION

1. Field of the Invention

The present invention relates to detachable handles for control devices and particularly to handles for rotary valves which are detachable for safety or other security reasons.

2. Description of the Prior Art

Detachable handles are fairly common for fluid valves as are valves with stem members designed for operation by wrenches or special tools. The reasons generally relate to security purposes such as where the valve is used to control dangerous fluids or where accidental or careless movement of the valve could upset a critical flow rate. Valves having this feature are usually specially designed for the purpose and have either no handle as such or a special handle that cannot be readily fixed to the valve stem. Many handles can be removed only after removing nuts or bolts. Frequently, and particularly with ball valves, loosening the securing nut loosens the entire stem assembly.

SUMMARY OF THE INVENTION

Now in accordance with the present invention, one arrangement has been found for economically providing a valve with a handle that can be utilized either as an affixed handle or a handle that is attached only in the manner of a tool when it is desired to operate the valve. The inventive arrangement uses a specially shaped washer placed over a valve stem such that the two must rotate together. A second smaller washer is placed over the shaped washer and a nut that is smaller in diameter than the shaped washer and larger in diameter than second smaller washer secures the assembly on the valve stem. A handle having an aperture cut out to fit the special shape of the shaped washer and freely passable over said nut is secured to the shaped washer by a spring clip, clipped over said smaller washer. Used without the spring clip the handle is separable and used with the spring clip, the handle is affixed. Both the handle and the clip can be removed or attached without disturbing the nut or the rest of the assembly. The handle is particularly adapted to economical manufacture as by stamping.

It is also a feature of the invention that the shaped washer and aperture in the handle are readily shaped to include an indicator of the operative position of the valve.

Thus it is an object of the invention to provide a control handle that is readily convertible from affixed use to detachable use.

It is a further object of the invention to provide a novel detachable handle for a ball valve.

It is a still further object of the invention to provide a detachable valve handle that is attachable only in one correct position.

It is a still further object of the invention to provide a detachable valve handle which is readily semipermanently affixed by an inexpensive spring clip.

Further objects and features of the invention will become apparent upon reading the following description together with the drawing.

DESCRIPTION OF A PREFERRED EMBODIMENT:

In the preferred embodiment, a detachable handle is implemented at no substantial cost difference from a permanent handle and can be used either as a permanent or a detachable handle.

Figure 1:
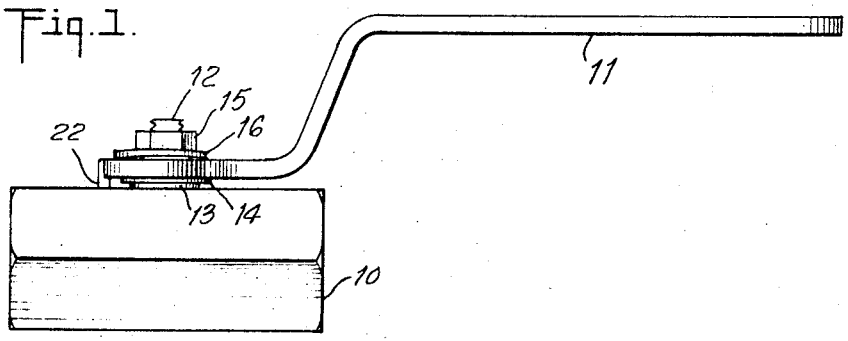
FIG. 1. A side elevation of one embodiment of the invention.
Figure 2:
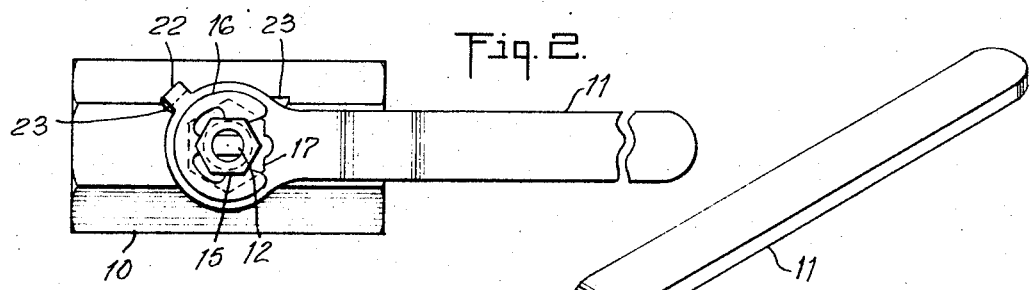
FIG. 2. A plan view of the embodiment of FIG. 1.
Figure 3:
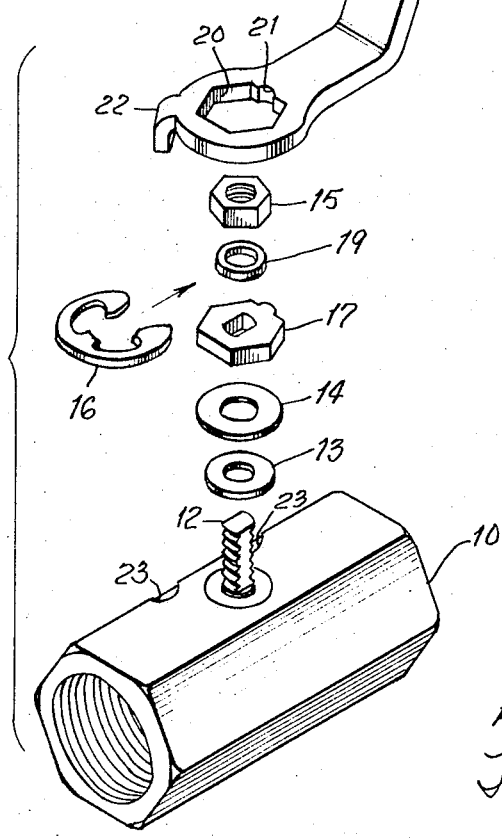
FIG. 3. An exploded view nn perspective of the embodiment of FIG. 1.

In FIG. 1, body 10 is the body of a valve. While the invention is not limited to ball valves, the illustration was made from an actual ball valve assembly. Handle 11 is depicted as a stamped metal handle that fits over and is secured to stem 12 of the valve. In further describing the assembly of the valve handle, reference is made to all the FIGS. 1, 2, and 3. The individual pieces are best illustrated in the exploded view of FIG. 3. In the particular embodiment shown, the valve stem 12 is installed from inside body 10, and the gaskets sealing it are secured in place by the various washers to be described and nut 15.

A first washer 13 placed over stem 12 is for spacing. Second washer 14 provides a bearing surface for handle 11. Washer 17 is a specially shaped washer being generally hexagonal in the depicted embodiment with an irregular projection from one of the six sides to insure that the handle is always installed in the correct position. Stem 12 is threaded to receive nut 15 but has flat cutaway sides matching a generally rectangular aperture in washer 7 to prevent relative motion between stem 12 and washer 17. Handle 11 has a stamped-out aperture 20 fitting accurately and easily over washer 17 and including a recessed portion 21 to fit the irregular projection of washer 17.

Washer 14 has a larger average diameter than aperture 20 of handle 11 so that when handle 11 is positioned over washer 17, it bears against washer 14. Handle 11, at least in the portion fitting over washer 17, has substantially the same thickness as washer 17. A further washer 19 is positioned over stem 12 between washer 17 and nut 15 so that when nut 15 is screwed down tightly it holds this assembly together and pulls stem 12 together with its sealing gaskets (not shown) tightly up against the interior surface of body 10. Washer 19 is smaller than the largest diameter of nut 15, and nut 15 is sufficiently small so that aperture 20 of handle 11 will pass readily over nut 15. Washer 19 is particularly dimensioned to receive snap ring 16. For example, the thickness of washer 19 should be at least as great and preferably slightly greater than that of snap ring 16. Snap ring 16 has its smallest internal diameter smaller than the smallest diameter of nut 15 so as to prevent snap ring 16 from riding up over nut 15 while snapped in place. Snap ring 16 has an external diameter larger than the diameter of aperture 20 of handle 11 so that handle 11 cannot pass over snap ring 16.

In production, the valve can be assembled completely except for handle 11 and snap ring 16. Handle 11 and snap ring 16 can be supplied to the consumer either separately or assembled to the valve as is convenient. In an embodiment such as shown, having a ball or plug valve element, handle 11 only makes a 90° rotation from full open to full close. A detent 22 is depicted as an extended finger portion of handle 11. Detent 22 mates with either of two recesses 23 milled in body 10 to provide stops at the full open and full close position of the valve.

The irregular projection of washer 17 is conveniently located to indicate the operative position of the valve. Thus it is preferred that washer 17 is shaped to fit stem 12 in a way that the irregular projection of washer 17 is in axial alignment with body 10 when the valve is fully open. Likewise, recess 21 of handle 11 is preferably in axial alignment with the length of handle 11 whereby the position of handle 11 indicates the operative position of the valve in the conventional manner. When the handle is in axial alignment, the valve is open; and when the handle is at right angles to the valve flow axis, the valve is closed.

While the invention has been described with particular reference to a ball valve using a snap ring, the invention is contemplated for providing handles in all manner of control devices. Rheostats and variable transformers are exemplary. While a conventional snap ring has been depicted for securing the detachable handle in place, other spring metal devices such as those known as "circlips" may be used. Still other suitable spring clips may be of a general U-shape such that they could be snapped into position over washer 19 with the closed portion of the "U" extending either up around nut 15 or off to the side as with snap ring 16. Thus it is intended to claim the invention broadly within the spirit and scope of the appended claims.

I claim:

1. A control device with a detachable handle comprising:
   a. a control body;
   b. a control stem assembly protruding from said body;
   c. fastening means fastened to said stem assembly external to said body securing said stem assembly tightly together and to said body;
   d. a handle mating with said control stem assembly, and
   e. a spring clip securing said handle to said stem assembly independently of said fastening means.

2. A control device according to claim 1 in which said control device is a valve.

3. A control device according to claim 2 in which said stem assembly comprises a stem, and sequentially assembled on said stem a first specially shaped washer nonrotatably fitting said stem, a second smaller washer fitting said stem and fastening means fastened to said stem for securing said stem assembly tightly together.

4. A control device according to claim 3 in which said handle has an aperture fitting said first washer.

5. A control device according to claim 4 in whcih said spring clip mates with said second washer for securing said handle in place on said first washer.

6. A control device according to claim 5 in which said second washer is smaller than said fastening means whereby said fastening means prevents said spring clip from sliding off said second washer.

7. A control device according to claim 4 in which said aperture is larger than said fastening means whereby said handle will pass readily over said fastening means for detachment when said spring clip is removed.

8. A control device according to claim 4 in which said stem assembly further comprises a third washer between said body and said first washer, and said spring clip and said third washer are both greater in diameter than said aperture whereby said handle is sandwiched between said spring clip and said third washer.

9. The combination of a stem assembly for a rotary valve and a detachable handle therefore in which said stem assembly includes a shaped washer which mates in a unique relationship with said handle and a spring clip mates with said stem assembly on top of said handle to secure said handle to said stem assembly mated to the periphery of said washer whereby when said handle is attached, it indicates the operative position of the stem assembly and when it is detached by removal of said spring clip, the shaped washer indicates the operative position of the stem assembly.

* * * * *